US012035009B2

United States Patent
Monkowski et al.

(10) Patent No.: US 12,035,009 B2
(45) Date of Patent: Jul. 9, 2024

(54) MULTIMEDIA PLAYBACK CONTROLLING SYSTEM

(71) Applicant: Toshiba Global Commerce Solutions, Inc., Durham, NC (US)

(72) Inventors: Phillip Monkowski, Durham, NC (US); Paul Lindsey, Durham, NC (US); Andrew Norris, Durham, NC (US); Dominic Lebron, Durham, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 148 days.

(21) Appl. No.: 17/710,529

(22) Filed: Mar. 31, 2022

(65) Prior Publication Data
US 2023/0319361 A1    Oct. 5, 2023

(51) Int. Cl.
*H04N 21/472* (2011.01)
*H04N 21/462* (2011.01)
*H04N 21/81* (2011.01)

(52) U.S. Cl.
CPC ... *H04N 21/47217* (2013.01); *H04N 21/4622* (2013.01); *H04N 21/8173* (2013.01)

(58) Field of Classification Search
None
See application file for complete search history.

(56) References Cited

U.S. PATENT DOCUMENTS

| 2011/0167345 | A1* | 7/2011 | Jones | H04N 21/44209 709/217 |
| 2016/0249108 | A1* | 8/2016 | Sexton | H04N 21/4622 |
| 2018/0004396 | A1* | 1/2018 | Ying | G06F 3/04817 |
| 2018/0024717 | A1* | 1/2018 | An | G06F 3/04845 715/719 |
| 2023/0027231 | A1* | 1/2023 | Smith | H04N 21/47 |

OTHER PUBLICATIONS

Github, "Controlling 3rd party iframe audio output on a page?" <https://github.com/w3c/mediacapture-output/issues/63> webpage available as early as Nov. 5, 2016 (8 pages).

(Continued)

*Primary Examiner* — Heather R Jones
(74) *Attorney, Agent, or Firm* — Kaufman & Canoles, P.C.

(57) ABSTRACT

Systems and methods of controlling playback of multimedia data from inline frames presented on a web page in a browser are provided. In one exemplary embodiment, a method is performed by a multimedia controller operationally coupled to a browser application executed on a computing device. Further, the browser application has a set of inline frames presented on a web page in a browser for display. Each inline frame has a web application configured to enable playback of multimedia data by the computing device. The method comprises receiving, from a first web application of a first inline frame, via the browser application, an indication that includes a request to playback multimedia data associated with the first web application and corresponding multimedia control information. In addition, the method includes controlling the playback of the multimedia data of the first web application based on that multimedia control information.

19 Claims, 11 Drawing Sheets

(56) References Cited

OTHER PUBLICATIONS

Stack Overflow, "How to play audio without strict limitations on JavaScript?" <https://stackoverflow.com/questions/66637044/how-to-play-audio-without-strict-limitations-on-javascript> webpage available as early as Mar. 15, 2021 (3 pages).

Stack Overflow, "Stop all audio inside iframes from parent" <https://stackoverflow.com/questions/43745161/stop-all-audio-inside-iframes-from-parent> webpage available as early as May 2, 2017 (2 pages).

* cited by examiner

400b

| | |
|---|---|
| BY A MULTIMEDIA CONTROLLER OPERATIONALLY COUPLED TO A BROWSER APPLICATION EXECUTED ON A COMPUTING DEVICE, THE BROWSER APPLICATION HAVING A SET OF INLINE FRAMES PRESENTED ON A WEB PAGE IN A BROWSER FOR DISPLAY, WITH EACH INLINE FRAME HAVING A WEB APPLICATION CONFIGURED TO ENABLE PLAYBACK OF MULTIMEDIA DATA BY THE COMPUTING DEVICE, RECEIVE, FROM A FIRST WEB APPLICATION OF A FIRST INLINE FRAME OF THE SET OF INLINE FRAMES, VIA THE BROWSER APPLICATION, AN INDICATION THAT INCLUDES A REQUEST TO PLAYBACK MULTIMEDIA DATA ASSOCIATED WITH THE FIRST WEB APPLICATION AND CORRESPONDING MULTIMEDIA CONTROL INFORMATION | 401b |
| CONTROL THE PLAYBACK OF THE MULTIMEDIA DATA OF THE FIRST WEB APPLICATION BASED ON THE MULTIMEDIA CONTROL INFORMATION OF THE FIRST WEB APPLICATION | 403b |
| DETERMINE TO PLAYBACK THE MULTIMEDIA DATA OF THE FIRST WEB APPLICATION BASED ON THE MULTIMEDIA CONTROL INFORMATION OF THE FIRST WEB APPLICATION | 405b |
| SEND, TO THE BROWSER APPLICATION, AN INDICATION TO PLAYBACK THE MULTIMEDIA DATA OF THE FIRST WEB APPLICATION BY THE COMPUTING DEVICE | 407b |
| DETERMINE TO INTERRUPT (E.G., STOP, PAUSE, MUTE, DELAY, OR ADJUST A VOLUME) PLAYBACK OF THE MULTIMEDIA DATA OF A SECOND WEB APPLICATION OF A SECOND INLINE FRAME OF THE SET OF INLINE FRAMES BASED ON THE MULTIMEDIA CONTROL INFORMATION OF THE FIRST WEB APPLICATION | 409b |
| SEND, TO THE BROWSER APPLICATION, AN INDICATION TO INTERRUPT THE PLAYBACK OF THE MULTIMEDIA DATA OF THE SECOND WEB APPLICATION BY THE COMPUTING DEVICE | 411b |

- 403e: PARSE THE MULTIMEDIA CONTROL INFORMATION OF THE FIRST WEB APPLICATION TO OBTAIN AN UNINTERRUPTED PLAYBACK INDICATION THAT INDICATES UNINTERRUPTED PLAYBACK ASSOCIATED WITH THE MULTIMEDIA DATA OF THE FIRST WEB APPLICATION

- 405e: CONTROL THE PLAYBACK OF THE MULTIMEDIA DATA OF THE FIRST WEB APPLICATION FURTHER BASED ON THE UNINTERRUPTED PLAYBACK INDICATION ASSOCIATED WITH THE MULTIMEDIA DATA OF THE FIRST WEB APPLICATION

- 407e: DETERMINE THAT THE PLAYBACK OF THE MULTIMEDIA DATA OF THE FIRST WEB APPLICATION IS TO BE UNINTERRUPTED BASED ON THE UNINTERRUPTED PLAYBACK INDICATION OF THE FIRST WEB APPLICATION

- 409e: DETERMINE NOT TO SEND, TO THE BROWSER APPLICATION, AN INDICATION TO INTERRUPT THE PLAYBACK OF THE MULTIMEDIA DATA OF THE FIRST WEB APPLICATION BY THE COMPUTING DEVICE

- 401f: BY A BROWSER APPLICATION EXECUTED ON A COMPUTING DEVICE THAT IS OPERATIONALLY COUPLED TO A MULTIMEDIA CONTROLLER, THE BROWSER APPLICATION HAVING A SET OF INLINE FRAMES PRESENTED ON A WEB PAGE IN A BROWSER FOR DISPLAY, WITH EACH INLINE FRAME HAVING A WEB APPLICATION CONFIGURED TO ENABLE PLAYBACK OF MULTIMEDIA DATA BY THE COMPUTING DEVICE, FORWARD, FROM A FIRST WEB APPLICATION OF A FIRST INLINE FRAME OF THE SET OF INLINE FRAMES, TO THE MULTIMEDIA CONTROLLER, AN INDICATION THAT INCLUDES A REQUEST TO PLAYBACK MULTIMEDIA DATA ASSOCIATED WITH THE FIRST WEB APPLICATION AND THE CORRESPONDING MULTIMEDIA CONTROL INFORMATION

- 403f: RECEIVE, FROM THE MULTIMEDIA CONTROLLER, AN INDICATION ASSOCIATED WITH PLAYBACK CONTROL OF THE MULTIMEDIA DATA OF THE FIRST WEB APPLICATION BASED ON MULTIMEDIA CONTROL INFORMATION OF THE FIRST WEB APPLICATION

FIG. 4F

MULTIMEDIA PLAYBACK CONTROLLING SYSTEM

BACKGROUND

When two or more multimedia sources are located in the same application, there can be problems coordinating the playback of each multimedia source. For example, a browser application can include multimedia sources loaded simultaneously in separate inline frames on a web page. The resulting playback of these multimedia sources can be problematic. Typical problems can include, simultaneous playback of the multimedia sources, multimedia controls affecting only one of the multimedia sources, and the inability to mute/unmute playback of each multimedia source.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 4A-E illustrate embodiments of a method performed by a multimedia controller of controlling playback of multimedia data from inline frames presented on a web page in a browser in accordance with various aspects as described herein. FIG. 4F illustrates one embodiment of a method performed by a computing device of controlling playback of multimedia data from inline frames presented on a web page in a browser in accordance with various aspects as described herein.

DETAILED DESCRIPTION

Figure 1A:
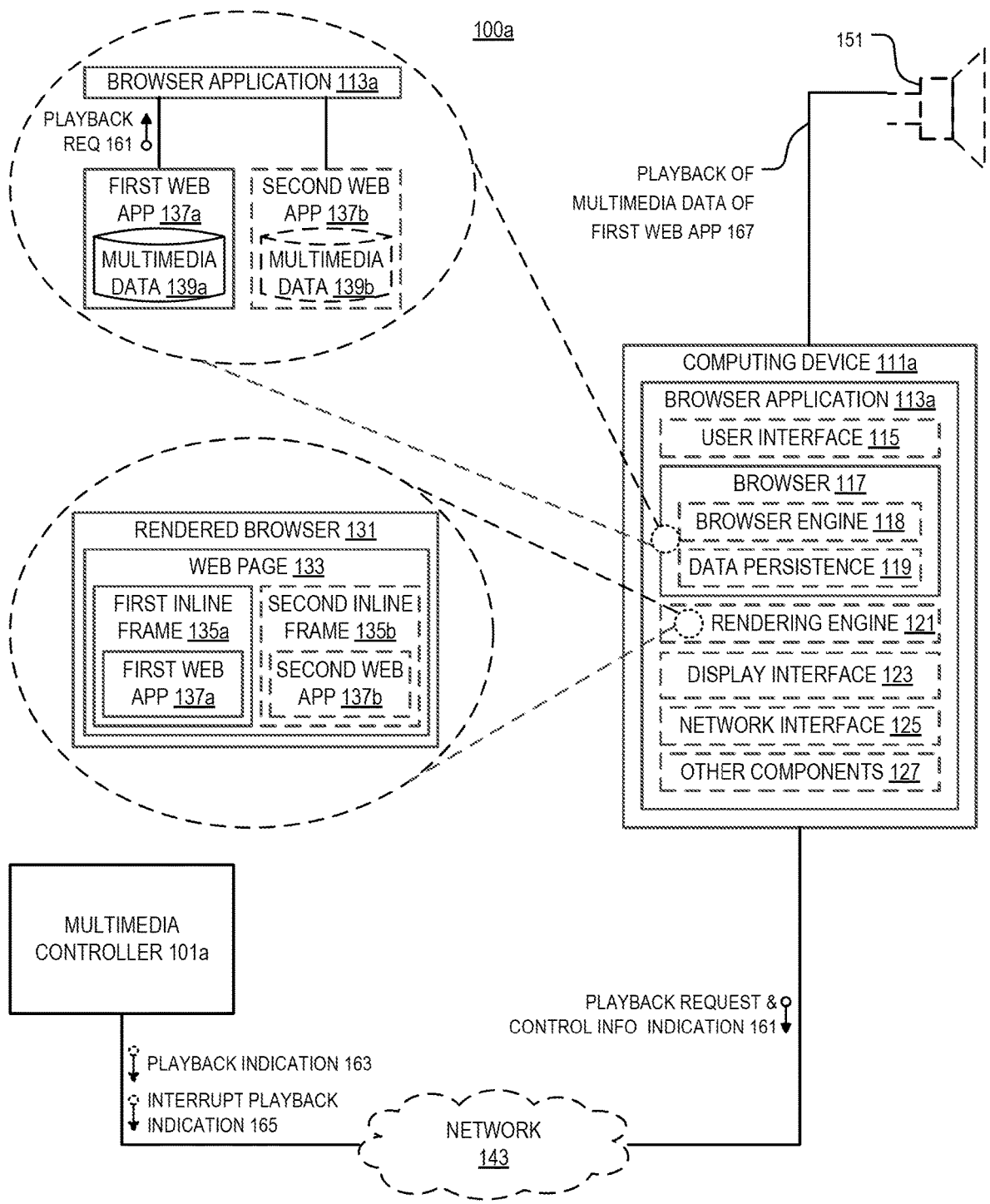
FIGS. 1A-B illustrates one embodiment of a system of controlling playback of multimedia data from inline frames presented on a web page in a browser in accordance with various aspects as described herein.

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

There is a need for improved techniques for controlling playback of multimedia data from inline frames presented on a web page in a browser, including controlling and prioritizing playback of the multimedia data from the inline frames. In addition, other desirable features and characteristics of the present disclosure will become apparent from the subsequent detailed description and embodiments, taken in conjunction with the accompanying figures and the foregoing technical field and background.

When multiple inline frames (e.g., HTML IFrame, XML XFame) are located within the same browser application, there can be problems coordinating the playback of multimedia data (e.g., text, audio, images, animations, or video) between the inline frames. Typical problems can include multiple multimedia data playing at the same time, multimedia controls only affecting one inline frame's multimedia data, and the inability to mute audio data simultaneously playing in another inline frame. As such, the improvements described herein include a multimedia controller that manages the playback of multimedia data from multiple inline frames.

For example, a set of web applications can be simultaneously loaded onto a browser from a single uniform resource locator (URL) using inline frames and can communicate between each other using typical browser communication techniques. In this scenario, a need arises to share multimedia control across the set of web applications such that each web application can be individually maintained, developed, and hosted so that the playback of multimedia data can be coordinated across the set of web applications. For instance, each of the following web applications can be simultaneously loaded from the same or different servers (e.g., cross-domain): (i) primary web application; (ii) first web application; (iii) second web application; and (iv) multimedia controller web application. The primary web application is responsible for loading the first and second web applications and the multimedia controller web application into corresponding inline frames and establishing secure communications between them. The first and second web applications are designed as essentially stand-alone web applications that can serve unrelated or loosely related purposes. The multimedia controller web application provides a multimedia service. While the first web application is visible or hidden from view, the first web application can request playback of multimedia data for the current user by issuing a request through the primary web application to the multimedia controller web application. The multimedia controller web application then adds the multimedia data with the requested attributes to a multimedia memory queue.

This same method can also be applied for playback of multimedia data by the second web application. To handle cases where requests to play multimedia data are simultaneously sent by the first and second web applications, each web application sends through the primary web application to the multimedia controller web application: (1) a multimedia command that indicates that (i) multimedia data needs to be played, (ii) playback of the multimedia data needs to be muted or unmuted, or (iii) the relative volume needs to be changed; (2) a priority assigned to each request that is used to determine which request is handled first, with a lower priority request being queued in memory until no higher priority requests are pending; (3) a flag that indicates that playback of the multimedia data can be interrupted by a higher priority request; and (4) a flag that indicates that the multimedia data cannot be delayed if there is playback of multimedia data in progress (e.g., cannot be queued, or will only play immediately if possible). The application programming interface (API) of the multimedia controller for requesting multimedia control can include all necessary information to handle the multimedia control in a human readable format.

Figure 1B:
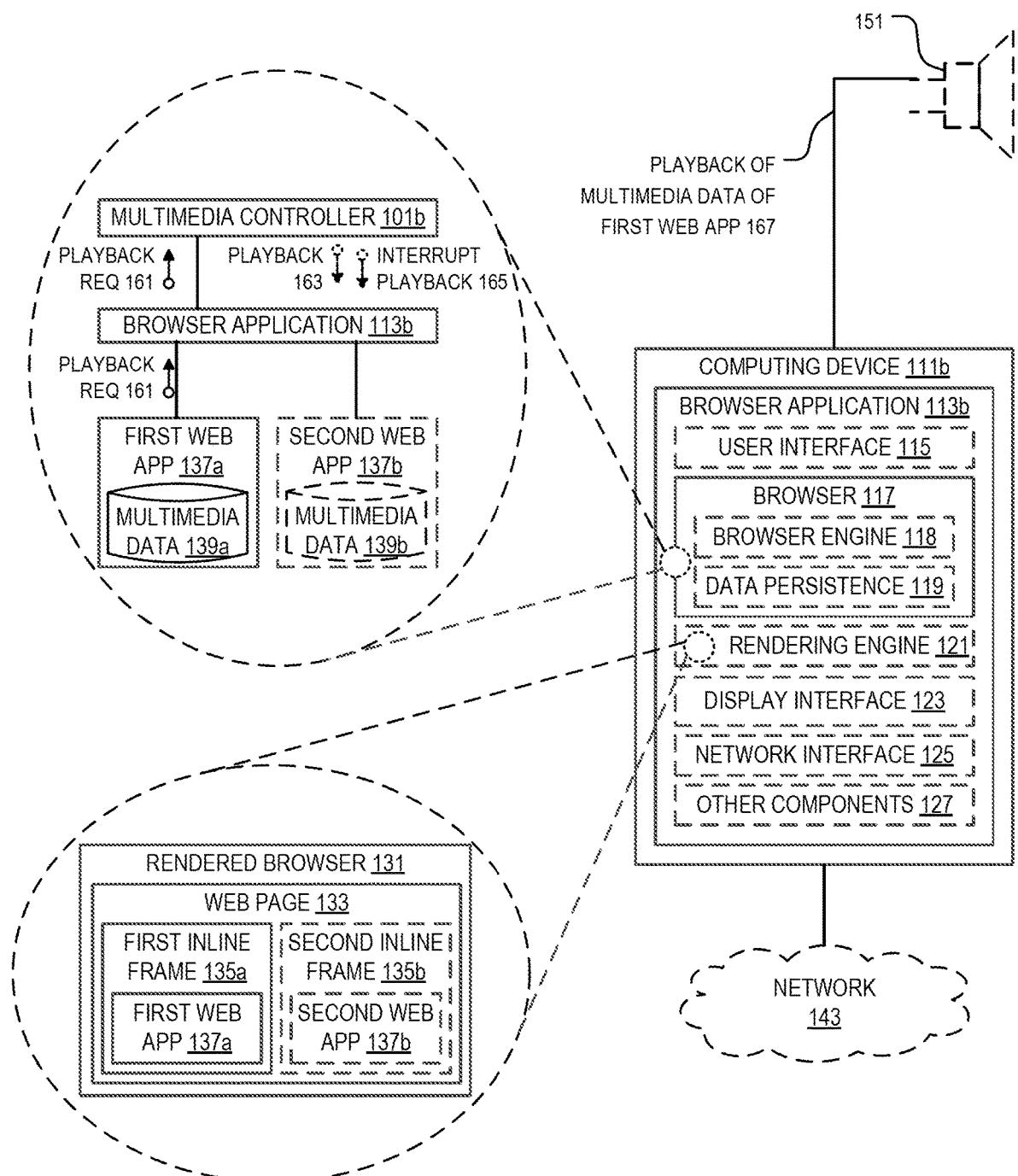

In this disclosure, systems and methods of controlling playback of multimedia data from inline frames presented on a web page of a browser within a browser application are provided. Further, the systems and methods of the present disclosure include a multimedia controller that manages and coordinates playback of the multimedia data of the inline frames (e.g., HTML IFrame, XML XFrame) loaded on the web page. For example, FIGS. 1A-B illustrate embodiments of a system 100a-b of controlling playback of multimedia data 139a-b from respective inline frames 135a-b presented on a web page 133 in a rendered browser 131 in accordance with various aspects as described herein. In one definition, an inline frame is an embedded element of a web page. In another definition, an inline frame is an embedded element of a document displayed in a web browser. In FIG. 1A, the system 100a can include a multimedia controller 101a operationally coupled to a browser application 113a of a computing device 111a such as over a network 143 (e.g., WiFi, Ethernet, Internet). Additionally or alternatively, in FIG. 1B, the system 100b includes a computing device 111b having a browser application 113b and a multimedia controller 101b integrated with the browser application 113b of the computing device 111b. For example, the multimedia controller 101b can be implemented as a circuit separate from the browser application 113b. In another example, the multimedia controller 101b can be implemented as a circuit integrated with the browser application 113b. In yet another example, the multimedia controller 101b can be implemented as a module of the browser application 113b that is executed in the same or different process of the browser application 113b. In a further example, the multimedia controller 101b can be implemented as a web application in an inline frame of a web page.

In FIGS. 1A-B, the browser application 113a-b can include a user interface 115, a browser 117, a rendering engine 121, a display interface 123, a network interface 125, another component 127, the like, or any combination thereof. Further, the browser application 113a-b can be implemented using a single process or multiple processes executed by the computing device 111a-b. For a multi-process architecture, all or any combination of components, elements, extensions, web applications, frames, inline frames, or the like can be executed in separate processes. In one example, each web page or browser tab has its own process executed by the computing device 111a-b. In another example, each frame has its own process executed by the computing device 111a-b. In yet another example, each web application has its own process executed by the computing device 111a-b. A web application can include one or more of the following applications: online office suite, photo sharing, video streaming, music streaming, bibliographic database, mapping, publication management, document management, blogging application, distributed social network, social news, social aggregation, social bookmarking, translation, homepage, virtual world, virtual web hosting application, web mail application, file sharing, password manager, web chat, web calendar, online file editing application, virtual machine provisioning application, word processor, spreadsheet, presentation application, project management application, video conferencing, computer-aided design application, video editing application, point-of-sale application, or the like. The user interface 115 is configured to manage the interaction between the browser 117 and user data (e.g., keyboard data, mouse data) communicated with the browser 117 through the computing device 111a. The user interface 115 can be configured to includes a top bar in the rendered browser 131 for entering a URL address. Further, the user interface 115 can be configured to include tabs, setting options, forward/backwards indicators, or the like.

In FIGS. 1A-B, the browser 117 includes a browser engine 118 and data persistence 119. The browser engine 118 is configured to query and control the rendering engine 121 based on inputs received from the user interface 115, network interface 125, or other components 127 of the browser application 113a-b. The data persistence 119 is configured to provide storage mechanisms for the browser 117 such as for local storage, global storage, database storage, file system storage, or the like. Further, the data persistence 119 is configured to manage user data such as a cache, cookies, bookmarks, preferences, or the like. The rendering engine 121 is configured to render content on a display such as by loading a web page, parsing files (e.g., HTML files), applying styles (e.g., cascading style sheets (CSS)), constructing frames and inline frames (e.g., HTML frame, HTML iFrame, XML XFame), painting frames, the like, or any combination thereof. As shown in FIGS. 1A-B, the browser engine 118 queries and controls the rendering engine 121 to output for display the rendered browser 131 having the rendered web page 133 with the first and second inline frames 135a-b and corresponding web applications 137a-b. The display interface 123 is configured to provide drawing and windowing primitives, user interface widgets, fonts, or the like. The network interface 125 is configured to fetch and handle resources related to the network 143 (e.g., LAN, WAN, Internet). The other components 127 may include a script interpreter (e.g., JavaScript) for reading and executing scripts and handling the result with the rendering engine 121, an XML parser, a display backend, a database manager, the like, or any combination thereof.

As shown in FIGS. 1A-B, in operation, the browser application 113a-b has the set of inline frames 135a-b presented on the web page 133 in the rendered browser 131 for display. Further, each inline frame 135a-b has a corresponding web application 137a-b configured to playback multimedia data by the computing device 111a-b. The multimedia controller 101a-b receives, from the first web application 137a through the browser application 113a-b, an indication 161 that includes a request to playback multimedia data of the first web application 137a and corresponding multimedia control information. In response, the multimedia controller 101a-b controls the playback of the multimedia data of each web application 137a-b based on the control information of the at least one of the set of web applications 137a-b. Multimedia data can be stored in memory of the computing device 111a-b, downloaded to the computing device 111a-b over the network 143, streamed to the computing device 111a-b over the network 143, the like, or any combination thereof.

In another embodiment, the multimedia controller 101a-b determines to playback the multimedia data of the first web application 137a based on the multimedia control information of the first or second web application 137a-b. In response, the multimedia controller 101 sends, to the browser application 113a-b, an indication 163 to playback the multimedia data of the first web application 137a by the computing device 111a-b. The computing device 111a-b receives the indication 163 and in response, outputs the playback 167 of the multimedia data of the first web application 137a to a speaker 151. Additionally or alternatively, the multimedia controller 101a-b determines to interrupt (e.g., stop, pause, mute, delay, or adjust a corresponding volume) playback of the multimedia data of the second web application 137b based on the multimedia control information of the first or second web application 137*a-b*. In response, the multimedia controller 101*a-b* sends, to the browser application 113*a-b*, an indication 165 to interrupt the playback of the multimedia data of the second web application 137*b* by the computing device 111*a-b*. The browser application 113*a-b* receives the indication 165 and in response, interrupts the playback of the multimedia data of the second web application 137*b*.

In another embodiment, the multimedia controller 101*a-b* parses the multimedia control information of the first or second web application 137*a-b* to obtain an indication that indicates a priority of the multimedia data of that web application 137*a-b*. In response, the multimedia controller 101*a-b* controls the playback of the multimedia data of the first or second web application 137*a-b* further based on the priority of the multimedia data of the first or second web application 137*a-b*. For instance, the multimedia controller 101*a-b* determines that the priority of the multimedia data of the first web application 137*a* is greater than the priority of the multimedia data of the second web application 137*b*. In response, the multimedia controller 101*a-b*, sends, to the browser application 113*a-b*, an indication 163 to playback the multimedia data of the first web application 137*b* by the computing device 111*a-b*. The computing device 101*a-b* receives the indication 163 and in response, outputs the playback 167 of the multimedia data of the first web application 137*a* to the speaker 151. Additionally or alternatively, the multimedia controller 101*a-b* determines to interrupt (e.g., stop, pause, mute, delay, or adjust a corresponding volume) playback of the multimedia data of the second web application 137*b* responsive to determining that the priority of the multimedia data of the first web application 137*a* is greater than the priority of the multimedia data of the second web application 137*b*. The multimedia controller 101*a-b* then sends, to the browser application 113*a-b*, an indication 165 to interrupt the playback of the multimedia data of the second web application 137*b* by the computing device 111*a-b*. The browser application 113*a-b* receives the indication 165 and in response, interrupts the playback of the multimedia data of the second web application 137*b*.

In another embodiment, the multimedia controller 101*a-b* parses the multimedia control information of each web application 137*a-b* to obtain an interruptible playback indication that indicates that the multimedia data of that web application 137*a-b* can be interrupted. The multimedia controller 101*a-b* controls the playback of the multimedia data by the first or second web application 137*a-b* based further on the interruptible playback indication associated with the multimedia data of the first or second web application 137*a-b*. For instance, the multimedia controller 101*a-b* determines that the multimedia data of the first web application 137*a* can be interrupted based on the interruptible playback indication associated with the multimedia data of the first web application 137*a*. In response, the multimedia controller 101*a-b*, sends, to the browser application 113*a-b*, an indication 165 to interrupt the playback of the multimedia data of the first web application 137*a* by the computing device 111*a-b*. The computing device 111*a-b* receives the indication 165 and in response, interrupts the playback of the multimedia data of the first web application 137*a*.

In another embodiment, the multimedia controller 101*a-b* parses the multimedia control information of each web application 137*a-b* to obtain an uninterrupted playback indication that indicates uninterrupted playback of the multimedia data of that web application 137*a-b*. The multimedia controller 101*a-b* controls the playback of the multimedia data by the first or second web application 137*a-b* based further on the uninterrupted playback indication associated with the multimedia data of the first or second web application 137*a-b*. For instance, the multimedia controller 101*a-b* determines that the playback of the multimedia data of the first web application 137*a* is to be uninterrupted based on the uninterrupted playback indication associated with the multimedia data of the first web application 137*a*. In response, the multimedia controller 101*a-b*, determines not to send, to the browser application 113*a-b*, an indication 165 to interrupt the playback of the multimedia data of the first web application 137*a* by the computing device 111*a-b*.

Figure 2A:
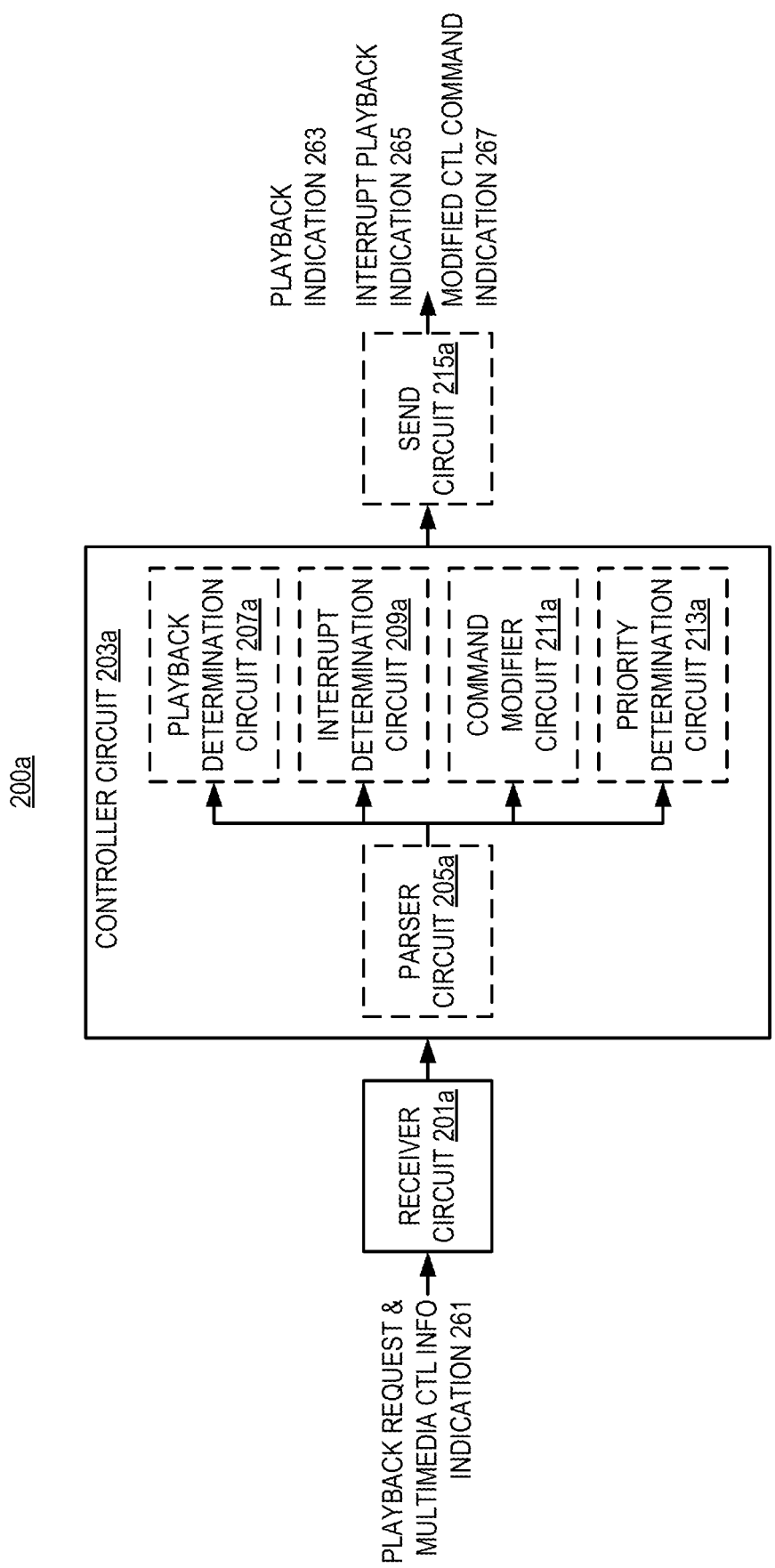
FIG. 2A-B illustrate embodiments of a multimedia controller and a computing device, respectively, in accordance with various aspects as described herein.

FIG. 2A illustrates one embodiment of a multimedia controller 200*a* in accordance with various aspects as described herein. In FIG. 2A, the device 200*a* implements various functional means, units, or modules (e.g., via the processing circuitry 301*a* in FIG. 3A, via the processing circuitry 501 in FIG. 5B, via software code, or the like), or circuits. In one embodiment, these functional means, units, modules, or circuits (e.g., for implementing the method(s) herein) may include for instance: a receiver circuit 201*a* operable to receive, from a web application of an inline frame, via a browser application or a certain web application of the browser application, an indication that includes a request to playback multimedia data of that web application and corresponding multimedia control information; a controller circuit 203*a* operable to control playback of multimedia data of a web application of an inline frame based on multimedia control information of that web application; a parser circuit 205*a* operable to parse multimedia control information of a web application of an inline frame; a playback determination circuit 207*a* operable to determine that the priority of multimedia data of a web application of an inline frame is greater than the priority of multimedia data of a web application of another inline frame; an interrupt determination circuit 209*a* operable to determine to interrupt or not interrupt playback of multimedia data of a web application of an inline frame based on multimedia control information of that web application; a command modifier circuit 211*a* operable to modify a multimedia control command indication to change which of a set of multimedia control commands to apply to multimedia data of a web application of an inline frame; a priority determination circuit 213*a* operable to determine that the priority of multimedia data of a web application of an inline frame is greater than the priority of multimedia data of a web application of another inline frame; and a send circuit 215*a* operable to send, to the browser application, information associated with playback of multimedia data of a web application of an inline frame.

Figure 2B:
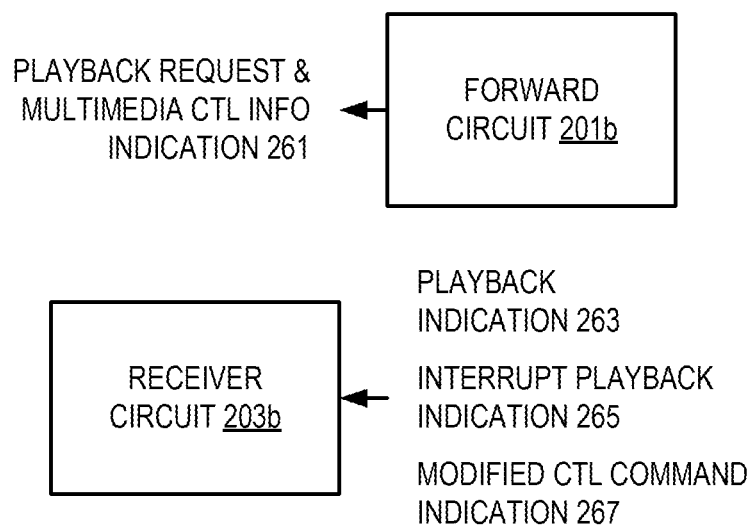

FIG. 2B illustrates one embodiment of a computing device 200*b* in accordance with various aspects as described herein. In FIG. 2B, the device 200*b* implements various functional means, units, or modules (e.g., via the processing circuitry 301*c* in FIG. 3C, via the processing circuitry 501 in FIG. 5A, via software code, or the like), or circuits. In one embodiment, these functional means, units, modules, or circuits (e.g., for implementing the method(s) herein) may include for instance: a forward circuit 201*b* operable to forward, by a browser application, from a web application of an inline frame, to a multimedia controller, an indication that includes a request to playback multimedia data associated with the web application and the corresponding multimedia control information; and a receiver circuit 203*b* operable to receive, by a browser application, from a multimedia controller, an indication associated with playback control of multimedia data of a web application of an inline frame based on multimedia control information of that web application.

Figure 3A:
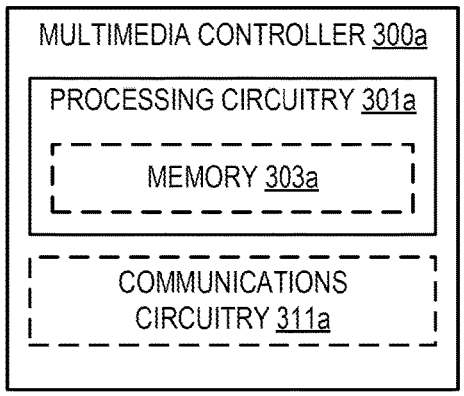
FIGS. 3A-B illustrate other embodiments of a multimedia controller in accordance with various aspects as described herein.
Figure 3B:
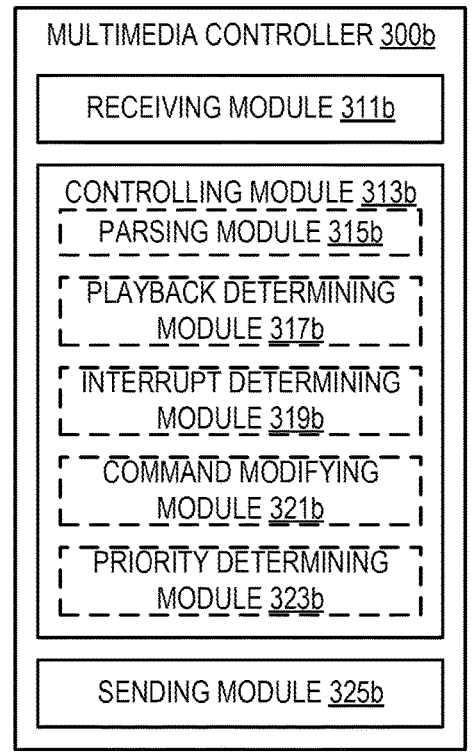

FIGS. 3A-B illustrate other embodiments of a multimedia controller 300a-b in accordance with various aspects as described herein. In FIG. 3A, the device 300a may include processing circuitry 301a that is operably coupled to memory 303a, communications circuitry 311a, the like, or any combination thereof. The communication circuitry 311a is configured to transmit and/or receive information to and/or from one or more other nodes via any communication technology. The processing circuitry 301a is configured to perform processing described herein, such as by executing instructions stored in memory 303a. The processing circuitry 303a in this regard may implement certain functional means, units, or modules.

Figure 5A:
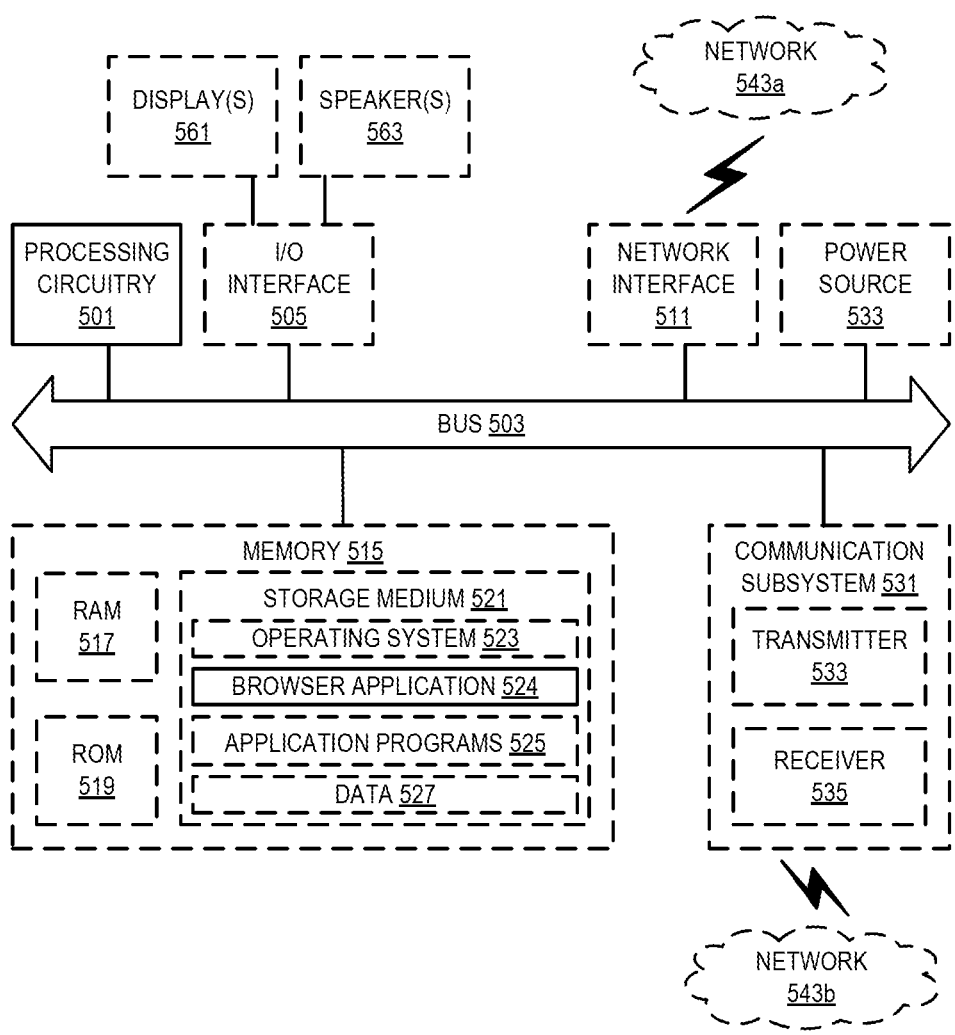
FIGS. 5A-B illustrate other embodiments of a computing device and a multimedia controller, respectively, in accordance with various aspects as described herein.
Figure 5B:
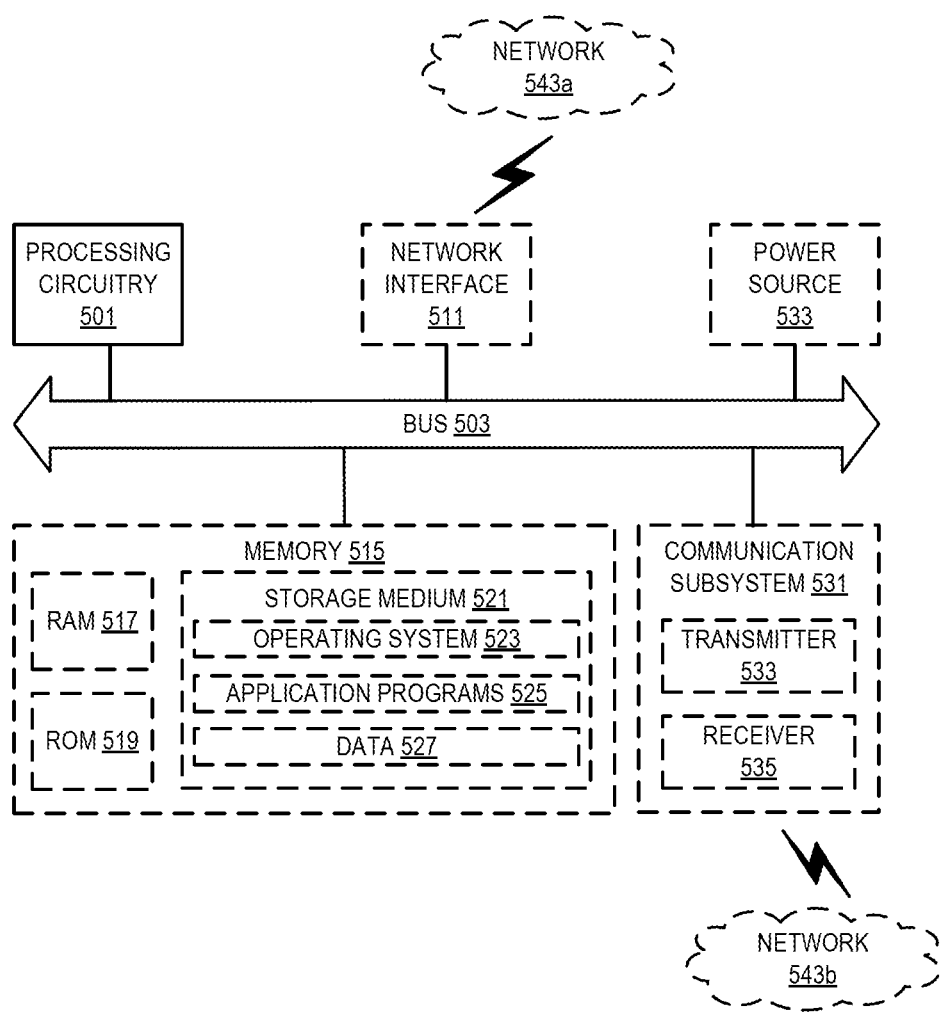

In FIG. 3B, the multimedia controller 300b implements various functional means, units, or modules (e.g., via the processing circuitry 301a in FIG. 3A, via the processing circuitry 501 in FIG. 5B, via software code, or the like). In one embodiment, these functional means, units, or modules (e.g., for implementing the method(s) described herein) may include for instance: a receiving module 311b for receiving, from a web application of an inline frame, via a browser application or a certain web application of the browser application, an indication that includes a request to playback multimedia data of that web application and corresponding multimedia control information; a controlling module 313b for controlling playback of multimedia data of a web application of an inline frame based on multimedia control information of that web application; a parsing module 315b for parsing multimedia control information of a web application of an inline frame; a playback determining module 317b for determining to playback multimedia data of a web application of an inline frame based on multimedia control information of that web application; an interrupt determining module 319b for determining to interrupt or not interrupt playback of multimedia data of a web application of an inline frame based on multimedia control information of that web application; a command modifying module 321b for modifying a multimedia control command indication to change which of a set of multimedia control commands to apply to multimedia data of a web application of an inline frame; a priority determining module 323b for determining that the priority of multimedia data of a web application of an inline frame is greater than the priority of multimedia data of a web application of another inline frame; and a sending module 325b for sending, to a browser application, information associated with playback of multimedia data of a web application of an inline frame.

Figure 3C:
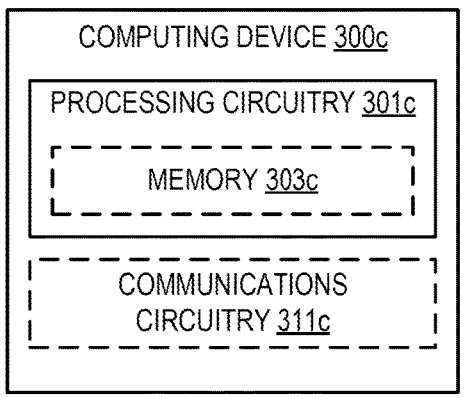
FIGS. 3C-D illustrate other embodiments of a computing device in accordance with various aspects as described herein.
Figure 3D:
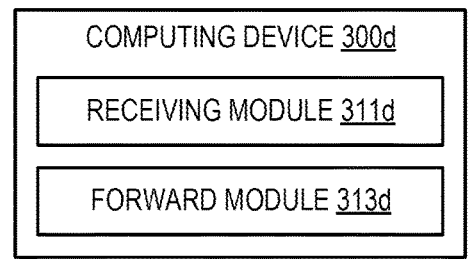

FIGS. 3C-D illustrate other embodiments of a computing device 300c-d in accordance with various aspects as described herein. In FIG. 3C, the device 300c may include processing circuitry 301c that is operably coupled to memory 303c, communications circuitry 311c, the like, or any combination thereof. The communication circuitry 311c is configured to transmit and/or receive information to and/or from one or more other nodes via any communication technology. The processing circuitry 301c is configured to perform processing described herein, such as by executing instructions stored in memory 303c. The processing circuitry 303c in this regard may implement certain functional means, units, or modules.

In FIG. 3D, the multimedia controller 300d implements various functional means, units, or modules (e.g., via the processing circuitry 301c in FIG. 3C, via the processing circuitry 501 in FIG. 5A, via software code, or the like). In one embodiment, these functional means, units, or modules (e.g., for implementing the method(s) described herein) may include for instance: a forwarding module 311d for forwarding, by a browser application, from a web application of an inline frame, to a multimedia controller, an indication that includes a request to playback multimedia data associated with the web application and the corresponding multimedia control information; and a receiving module 313d for receiving, by a browser application, from a multimedia controller, information associated with playback control of multimedia data of a web application of an inline frame based on multimedia control information of that web application.

Figure 4A:
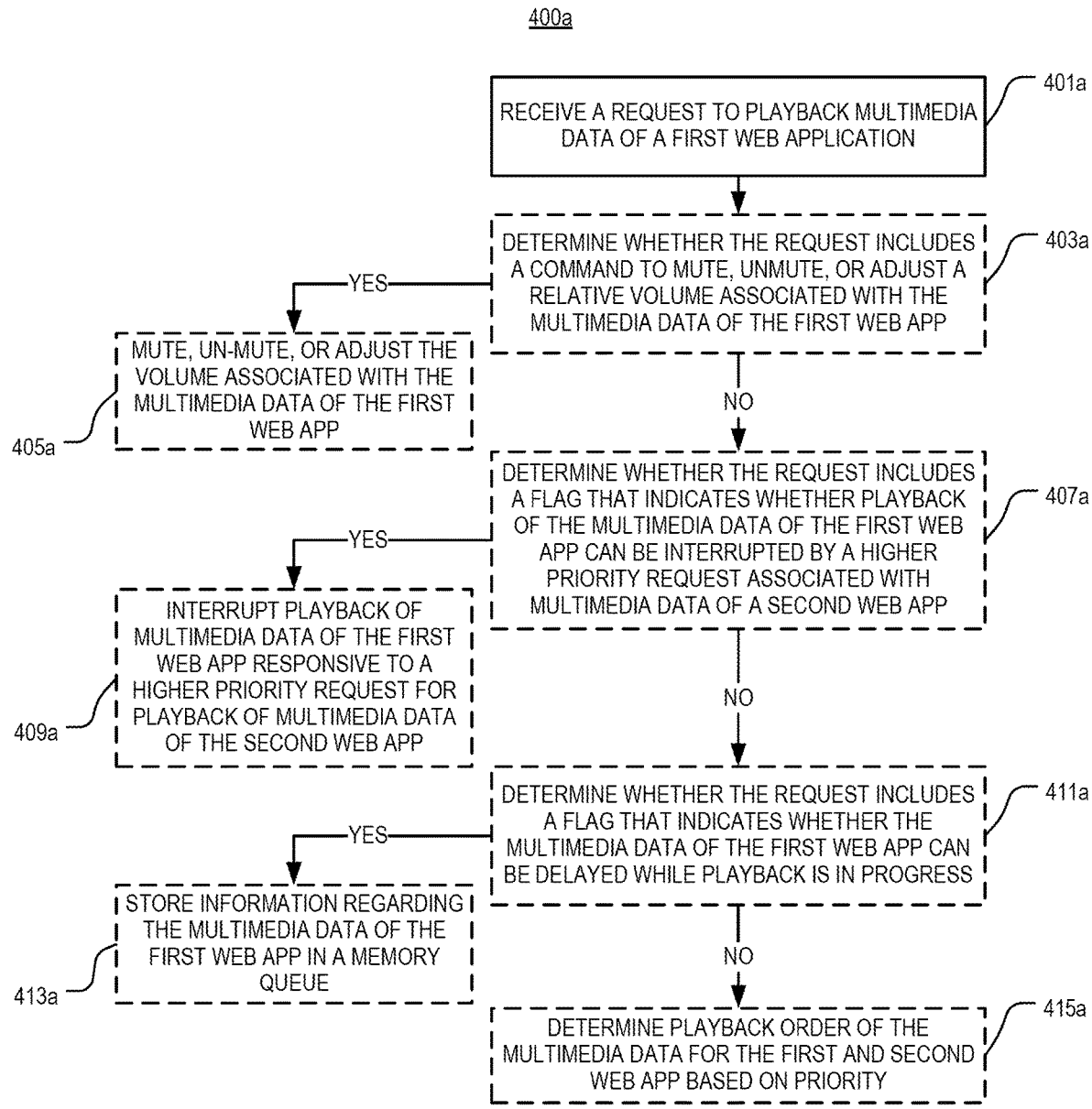

FIGS. 4A-E illustrate embodiments of a method performed by a multimedia controller 101a-b, 200a, 300a-b, 500b of controlling playback of multimedia data from inline frames presented on a web page in a browser in accordance with various aspects as described herein. In FIG. 4A, the method 400a may start, for instance, at block 401a where it includes receiving, by the multimedia controller, from a first web application of a first inline frame presented on a web page in a browser by a browser application executed on a computing device, a request to playback multimedia data of the first web application. At block 403a, the method 400a may include determining whether the request to playback multimedia data of the first web application includes a command to, at least one of, mute or unmute the playback, or adjust a relative volume of the playback. If the request includes one of these commands, then the method 400a may mute, unmute, or adjust the volume of the playback, as represented by block 405a.

In FIG. 4A, the method 400 may include determining whether the request to playback multimedia data of the first web application includes a flag that indicates whether the multimedia data can be interrupted by a higher priority request for playback of multimedia data of a second web application of a second inline frame presented in the web page in the browser, as represented by block 407a. If the request includes the interruptible playback flag, then the method 400a may include interrupting the playback of the multimedia data of the first web application responsive to receiving a higher priority request to playback multimedia data of the second application of the second inline frame, as represented by block 409a.

At block 411a, the method 400a may include determining whether the request to playback multimedia data includes a flag that indicates whether the request includes a flag that indicates whether the multimedia data of the first web application can be delayed while playback of that multimedia data is in progress. If so, then the method 400a may include queuing/storing the multimedia data of the first application and corresponding multimedia information in a memory queue for later playback by the computing device, as represented by block 413a. At block 415a, the method 400a may include determining the playback order of the first and second multimedia data based on the corresponding priorities.

In FIG. 4B, the method 400b may start, for instance, at block 401b where it includes receiving, from a first web application of a first inline frame of the set of inline frames, via the browser application, an indication that includes a request to playback multimedia data associated with the first web application and corresponding multimedia control information. At block 403b, the method includes controlling the playback of the multimedia data of the first web application based on the multimedia control information of the first web application. At block 405b, the method may include determining to playback the multimedia data of the first web application based on the multimedia control information of the first web application. At block 407b, the method 400b may include sending, to the browser application, an indication to playback the multimedia data of the first web application by the computing device. At block 409b, the method 400b may include determine to interrupt (e.g., stop, pause, mute, delay, or adjust a volume) playback of the multimedia data of a second web application of a second inline frame of the set of inline frames based on the multimedia control information of the first web application. At block 411b, the method 400b may include send, to the browser application, an indication to interrupt the playback of the multimedia data of the second web application by the computing device.

Figure 4C:
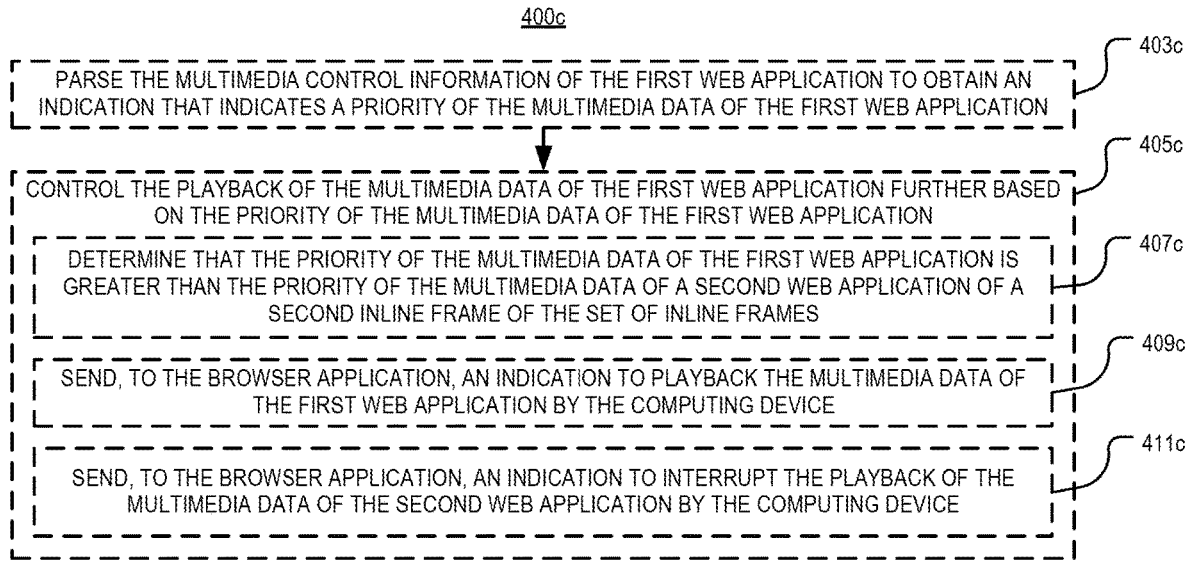

In FIG. 4C, the method 400c may start, for instance, at block 403c where it may include parsing the multimedia control information of the first web application to obtain an indication that indicates a priority of the multimedia data of the first web application. At block 405c, the method 400c may include controlling the playback of the multimedia data of the first web application further based on the priority of the multimedia data of the first web application. At block 407c, the method 400c may include determining that the priority of the multimedia data of the first web application is greater than the priority of the multimedia data of the second web application of the second inline frame of the set of inline frames. At block 409c, the method 400c may include sending, to the browser application, an indication to playback the multimedia data of the first web application by the computing device. At block 411c, the method 400c may include sending, to the browser application, an indication to interrupt the playback of the multimedia data of the second web application by the computing device.

Figure 4D:
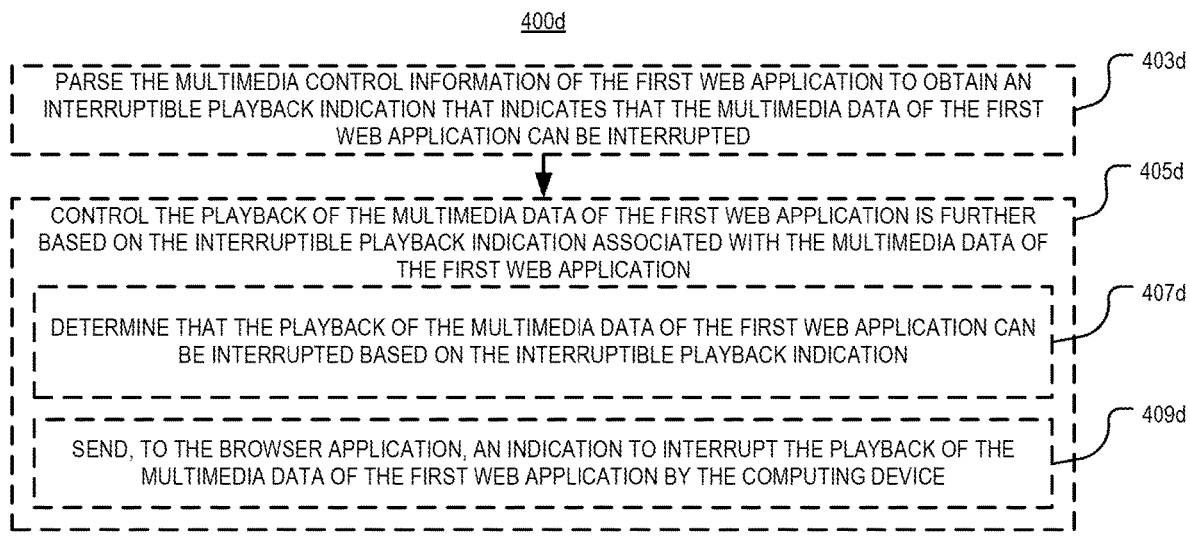

In FIG. 4D, the method 400d may start, for instance, at block 403d where it may include parsing the multimedia control information of the first web application to obtain an interruptible playback indication that indicates that the multimedia data of the first web application can be interrupted. At block 405d, the method 400d may include controlling the playback of the multimedia data of the first web application further based on the interruptible playback indication associated with the multimedia data of the first web application. At block 407d, the method 400d may include determining that the playback of the multimedia data of the first web application can be interrupted based on the interruptible playback indication. At block 409d, the method 400d may include sending, to the browser application, an indication to interrupt the playback of the multimedia data of the first web application by the computing device.

In FIG. 4E, the method 400e may start, for instance, at block 403e where it may include parsing the multimedia control information of the first web application to obtain an uninterrupted playback indication that indicates uninterrupted playback associated with the multimedia data of the first web application. At block 405e, the method 400e may include controlling the playback of the multimedia data of the first web application further based on the uninterrupted playback indication associated with the multimedia data of the first web application. At block 407e, the method 400e may include determining that the playback of the multimedia data of the first web application is to be uninterrupted based on the uninterrupted playback indication of the first web application. At block 409e, the method 400e may include determine not to send, to the browser application, an indication to interrupt the playback of the multimedia data of the first web application by the computing device.

FIG. 4F illustrates one embodiment of a method 400f performed by a computing device 111a-b, 200b, 300c-d, 500a of controlling playback of multimedia data from inline frames presented on a web page in a browser in accordance with various aspects as described herein. In FIG. 4F, the method 400f may start, for instance, at block 401f where it includes forwarding, from a first web application of a first inline frame of the set of inline frames, to a multimedia controller, an indication that includes a request to playback multimedia data associated with the first web application and the corresponding multimedia control information. At block 403f, the method 400f includes receiving, from the multimedia controller, an indication associated with playback control of the multimedia data of the first web application based on multimedia control information of the first web application.

FIG. 5A illustrates another embodiment of a computing device 500a in accordance with various aspects as described herein. In FIG. 5A, device 500a includes processing circuitry 501 that is operatively coupled to input/output interface 505, network connection interface 511, memory 515 including random access memory (RAM) 517, read-only memory (ROM) 519, and storage medium 521 or the like, communication subsystem 531, power source 533, and/or any other component, or any combination thereof. The input/output interface 505 may be configured to provide a communication interface to an input device, output device, or input and output device. The device 500a may be configured to use an output device via input/output interface 505. An output device may use the same type of interface port as an input device. For example, a USB port may be used to provide input to and output from the device 500a. The output device may be a speaker 563, a sound card, a video card, a display 561, a monitor, a printer, an actuator, an emitter, a smartcard, another output device, or any combination thereof. The device 500a may be configured to use an input device via input/output interface 505 to allow a user to capture information into the device 500a. The input device may include a touch-sensitive or presence-sensitive display, an image sensor, (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

FIG. 5B illustrates another embodiment of a multimedia controller 500b in accordance with various aspects as described herein. In FIG. 5B, device 500b includes processing circuitry 501 that is operatively coupled to network connection interface 511, memory 515 including RAM 517, ROM 519, and storage medium 521 or the like, communication subsystem 531, power source 533, and/or any other component, or any combination thereof.

In FIGS. 5A-B, storage medium 521 may include operating system 523, application program 525, data 527, the like, or any combination thereof. In other embodiments, storage medium 521 may include other similar types of information. Certain devices may utilize all of the components shown in FIGS. 5A-B, or only a subset of the components. The level of integration between the components may vary from one device to another device. Further, certain devices may contain multiple instances of a component, such as multiple processors, memories, neural networks, network connection interfaces, transceivers, etc.

In FIGS. 5A-B, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIGS. 5A-B, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, multimedia controller as described herein, a widget or gadget engine, or another application, and a data file 527. The storage medium 521 may store, for use by the device 500a-b, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIGS. 5A-B, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500a-b or partitioned across multiple components of the device 500a-b. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a multimedia controller operationally coupled to a browser application executed on a computing device. Further, the browser application has a set of inline frames presented on a web page in a browser for dis play. Each inline frame has a web application configured to enable playback of multimedia data by the computing device. The method includes receiving, from a first web application of a first inline frame of the set of inline frames, via the browser application, an indication that includes a request to playback multimedia data associated with the first web application and corresponding multimedia control information. In addition, the method includes controlling the playback of the multimedia data of the first web application based on the multimedia control information of the first web application.

In another exemplary embodiment, the step of controlling further includes determining to playback the multimedia data of the first web application based on the multimedia control information of the first web application and in response, sending, to the browser application, an indication to playback the multimedia data of the first web application by the computing device.

In another exemplary embodiment, the step of controlling further includes determining to interrupt playback of the multimedia data of a second web application of a second inline frame of the set of inline frames based on the multimedia control information of the first web application and in response, sending, to the browser application, an indication to interrupt the playback of the multimedia data of the second web application by the computing device.

In another exemplary embodiment, the method further includes parsing the multimedia control information of the first web application to obtain a multimedia control command indication that indicates which of a set of multimedia control commands to apply to the multimedia data of that web application. In addition, the step of controlling is further based on the multimedia control command indication associated with the multimedia data of the first web application.

In another exemplary embodiment, the step of controlling further includes modifying the multimedia control command indication to change which of the set of multimedia control commands to apply to the multimedia data of the first web application and in response, sending, to the browser application, the modified multimedia control command indication.

In another exemplary embodiment, the set of multimedia control commands includes a command to interrupt the playback of multimedia data of a web application by the computing device.

In another exemplary embodiment, the set of multimedia control commands includes one or more commands to stop, pause, mute, unmute, delay, adjust a corresponding volume, the like, or any combination thereof associated with playback of multimedia data of a web application of the computing device.

In another exemplary embodiment, the method further includes parsing the multimedia control information of the first web application to obtain an indication that indicates a priority of the multimedia data of the first web application. In addition, the step of controlling is further based on the priority of the multimedia data of the first web application.

In another exemplary embodiment, the step of controlling further includes sending, to the browser application, an indication to playback the multimedia data of the first web application by the computing device responsive to determining that the priority of the multimedia data of the first web application is greater than the priority of the multimedia data of a second web application of a second inline frame of the set of inline frames.

In another exemplary embodiment, the step of controlling further includes sending, to the browser application, an indication to interrupt the playback of the multimedia data of a second web application of a second inline frame of the set of inline frames by the computing device responsive to determining that the priority of the multimedia data of the first web application is greater than the priority of the multimedia data of the second web application.

In another exemplary embodiment, the method further includes parsing the multimedia control information of the first web application to obtain an interruptible playback indication that indicates that the multimedia data of the first web application can be interrupted. In addition, the step of controlling is further based on the interruptible playback indication associated with the multimedia data of the first web application.

In another exemplary embodiment, the interruptible playback indication further indicates that the playback of the multimedia data of the first web application can be interrupted if the multimedia data of a second web application of a second inline frame of the set of inline frames has a higher priority.

In another exemplary embodiment, the step of controlling further includes sending, to the browser application, an indication to interrupt the playback of the multimedia data of the first web application by the computing device responsive to determining that the playback of the multimedia data of the first web application can be interrupted based on the interruptible playback indication.

In another exemplary embodiment, the method further includes parsing the multimedia control information of the first web application to obtain an uninterrupted playback indication that indicates uninterrupted playback associated with the multimedia data of the first web application. In addition, the step of controlling is further based on the uninterrupted playback indication associated with the multimedia data of the first web application.

In another exemplary embodiment, the step of controlling further includes determining not to send, to the browser application, an indication to interrupt the playback of the multimedia data of the first web application by the computing device responsive to determining that the playback of the multimedia data of the first web application is to be uninterrupted based on the uninterrupted playback indication of the first web application.

In another exemplary embodiment, the browser application is configured to load each inline frame on the web page in the browser, with each inline frame being associated with a same URL.

In another exemplary embodiment, the browser application is configured to load each inline frame on the web page in the browser, with each inline frames being associated with a different URL.

In one exemplary embodiment, a multimedia controller comprises processing circuitry and a memory, with the memory comprising instructions executable by the processing circuitry whereby the processing circuitry is configured to receive, from a first web application of a first inline frame of a set of inline frames presented on a web page in a browser for display by a browser application executed on a computing device, an indication that includes a request to playback multimedia data associated with the first web application and corresponding multimedia control information. Each inline frame has a web application configured to enable playback of multimedia data by the computing device. The processing circuitry is further configured to control the playback of the multimedia data of the first web application based on the multimedia control information of the first web application.

In one exemplary embodiment, a method is performed by a browser application executed on a computing device that is operationally coupled to a multimedia controller. Further, the browser application has a set of inline frames presented on a web page in a browser for display, with each inline frame having a web application configured to enable playback of multimedia data by the computing device. The method includes receiving, from the multimedia controller, an indication associated with playback control of the multimedia data of a first web application of a first inline frame of the set of inline frames based on multimedia control information of the first web application responsive to forwarding, from the first web application, to the multimedia controller, an indication that includes a request to playback multimedia data associated with the first web application and the corresponding multimedia control information.

In one exemplary embodiment, a computing device includes processing circuitry and a memory, with the memory comprising instructions executable by the processing circuitry whereby the processing circuitry is configured to receive, by a browser application executed on the computing device, from a multimedia controller, an indication associated with playback control of multimedia data of a first web application of a first inline frame of a set of inline frames presented on a web page in a browser for display by the browser application based on multimedia control information of the first web application responsive to forwarding, from the first web application, to the multimedia controller, an indication that includes a request to playback multimedia data associated with the first web application and the corresponding multimedia control information.

In another exemplary embodiment, the browser is configured to load the web page, with the web page including the set of web applications.

In another exemplary embodiment, each web application is associated with hypertext markup language (HTML) iframe.

In another exemplary embodiment, each web application is associated with extensible markup language (XML) XFrame.

In another exemplary embodiment, the multimedia controller is configured as a web application loaded into a third inline frame on the web page of the browser application.

In another exemplary embodiment, the multimedia controller is operationally coupled to the web application of each inline frame on the web page through a fourth web application of the browser application. The fourth web application can be configured to load the first and second web applications into the respective first and second inline frames on the web page. Further, the fourth web application can be configured to load the multimedia controller as the third web application into the third inline frame on the web page of the browser application.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
  by a multimedia controller operationally coupled to a browser application executed on a computing device, the browser application having a set of inline frames presented on a web page in a browser for display, with a first inline frame of the set of inline frames having a first web application configured to enable playback of multimedia data by the computing device and the multimedia controller being configured as a second web application of a second inline frame of the set of inline frames,
  receiving, from the first web application, via the browser application, an indication that includes a request to playback multimedia data associated with the first web application and corresponding multimedia control information; and
  controlling the playback of the multimedia data of the first web application based on the multimedia control information of the first web application.

2. The method of claim 1, wherein the controlling further includes:
  determining to playback the multimedia data of the first web application based on the multimedia control information of the first web application; and
  sending, by the multimedia controller, to the browser application, an indication to playback the multimedia data of the first web application by the computing device.

3. The method of claim 2, wherein the controlling further includes:
  determining to interrupt playback of the multimedia data of a third web application of a third inline frame of the set of inline frames based on the multimedia control information of the first web application; and
  sending, by the multimedia controller, to the browser application, an indication to interrupt the playback of the multimedia data of the third web application by the computing device.

4. The method of claim 1, further comprising:
  parsing the multimedia control information of the first web application to obtain a multimedia control command indication that indicates which of a set of multimedia control commands to apply to the multimedia data of that web application; and
  wherein the controlling is further based on the multimedia control command indication associated with the multimedia data of the first web application.

5. The method of claim 4, wherein the controlling further includes:
  modifying the multimedia control command indication to change which of the set of multimedia control commands to apply to the multimedia data of the first web application; and
  sending, to the browser application, the modified multimedia control command indication.

6. The method of claim 5, wherein the set of multimedia control commands includes a command to interrupt the playback of the multimedia data of a web application by the computing device.

7. The method of claim 1, further comprising:
  parsing the multimedia control information of the first web application to obtain an indication that indicates a priority of the multimedia data of the first web application; and
  wherein the controlling is further based on the priority of the multimedia data of the first web application.

8. The method of claim 7, wherein the controlling further includes:
  sending, by the multimedia controller, to the browser application, an indication to playback the multimedia data of the first web application by the computing device responsive to determining that the priority of the multimedia data of the first web application is greater than the priority of the multimedia data of a third web application of a third inline frame of the set of inline frames.

9. The method of claim 7, wherein the controlling further includes:
  sending, by the multimedia controller, to the browser application, an indication to interrupt the playback of the multimedia data of a third web application of a third inline frame of the set of inline frames by the computing device responsive to determining that the priority of the multimedia data of the first web application is greater than the priority of the multimedia data of the third web application.

10. The method of claim 1, further comprising:
parsing the multimedia control information of the first web application to obtain an interruptible playback indication that indicates that the multimedia data of the first web application can be interrupted; and
wherein the controlling is further based on the interruptible playback indication associated with the multimedia data of the first web application.

11. The method of claim 10, wherein the interruptible playback indication further indicates that the multimedia data of the first web application can be interrupted if the multimedia data of a third web application of a third inline frame of the set of inline frames has a higher priority.

12. The method of claim 10, wherein the controlling further includes:
sending, to the browser application, an indication to interrupt the playback of the multimedia data of the first web application by the computing device responsive to determining that the playback of the multimedia data of the first web application can be interrupted based on the interruptible playback indication.

13. The method of claim 1, further comprising:
parsing the multimedia control information of the first web application to obtain an uninterrupted playback indication that indicates uninterrupted playback associated with the multimedia data of the first web application; and
wherein the controlling is further based on the uninterrupted playback indication associated with the multimedia data of the first web application.

14. The method of claim 13, wherein the controlling further includes:
determining not to send, to the browser application, an indication to interrupt the playback of the multimedia data of the first web application by the computing device responsive to determining that the playback of the multimedia data of the first web application is to be uninterrupted based on the uninterrupted playback indication of the first web application.

15. The method of claim 1, wherein the browser application is configured to load each inline frame on the web page in the browser, with each inline frame being associated with a certain uniform resource locator (URL).

16. The method of claim 1, wherein the multimedia controller is operationally coupled to the first web application and a third web application of a third inline frame of the set of inline frames through a primary web application of the browser application, with the primary web application being configured to contemporaneously load the first, second and third web applications into the corresponding inline frames on the web page.

17. A multimedia controller, comprising:
processing circuitry and a memory, the memory comprising instructions executable by the processing circuitry whereby the processing circuitry is configured to:
receive, from a first web application of a first inline frame of a set of inline frames presented on a web page in a browser for display by a browser application executed on a computing device, an indication that includes a request to playback multimedia data associated with the first web application and corresponding multimedia control information, with the first web application being configured to enable playback of multimedia data by the computing device and the multimedia controller being configured as a second web application of a second inline frame of the set of inline frames; and
control the playback of the multimedia data of the first web application based on the multimedia control information of the first web application.

18. A method, comprising:
by a browser application executed on a computing device that is operationally coupled to a multimedia controller, the browser application having a set of inline frames presented on a web page in a browser for display, with a first inline frame gf the set of inline frames having a first web application configured to enable playback of multimedia data by the computing device and the multimedia controller being configured as a second web application of a second inline frame of the set of inline frames,
receiving, from the multimedia controller, an indication associated with playback control of the multimedia data of the first web application based on multimedia control information of the first web application and responsive to forwarding, from the first web application, to the multimedia controller, an indication that includes a request to playback multimedia data associated with the first web application and the corresponding multimedia control information.

19. A computing device, comprising:
processing circuitry and a memory, the memory comprising instructions executable by the processing circuitry whereby the processing circuitry is configured to:
receive, by a browser application executed on the computing device, from a multimedia controller, an indication associated with playback control of multimedia data of a first web application of a first inline frame of a set of inline frames presented on a web page in a browser for display by the browser application based on multimedia control information of the first web application and responsive to forwarding, from the first web application, to the multimedia controller, an indication that includes a request to playback multimedia data associated with the first web application and the corresponding multimedia control information, with the first web application being configured to enable playback of multimedia data by the computing device and the multimedia controller being configured as a second web application of a second inline frame of the set of inline frame.

* * * * *